Patented July 18, 1933

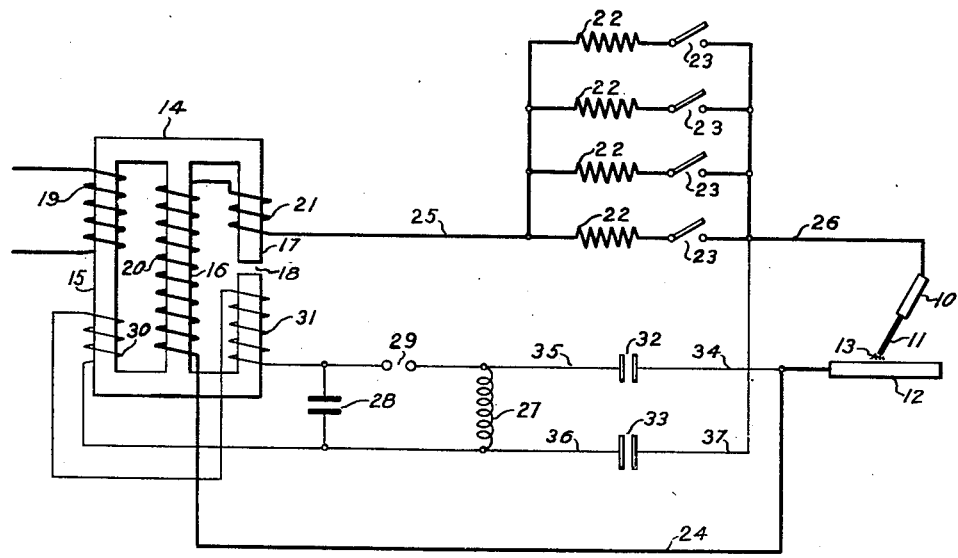

1,918,963

UNITED STATES PATENT OFFICE

ERVYL M. GLENN AND ALBERT M. WIGGINS, OF SHARON, PENNSYLVANIA, ASSIGNORS TO WESTINGHOUSE ELECTRIC AND MANUFACTURING COMPANY, A CORPORATION OF PENNSYLVANIA

ARC WELDING APPARATUS

Application filed November 26, 1930. Serial No. 498,365.

Our invention relates to apparatus for arc-welding and has particular relation to alternating-current arc-welding.

When alternating current is used for arc-welding, the arc cannot be maintained readily because of the periodic nature of the current. This is especially true when currents of 100 to 200 amperes are used and the frequency is 60 cycles per second.

It has been the practice in the past to cause a high-frequency high-voltage secondary current to flow in the arc which tends to stabilize its operation. This secondary current provides and maintains an ionized path for the welding current, in a manner well understood by those skilled in the art. As long as the welding electrodes are maintained in proper relation, the welding current continues to flow and will be disrupted only when the welding electrodes are moved so far apart that the high-frequency voltage cannot bridge the gap between them.

In the past, the high-frequency high-voltage secondary current has been applied to the welding electrodes at all times when the welding apparatus was energized. When the operator moved the electrodes sufficiently far apart to stop the welding operation for changing electrodes or for some other purpose, he was subjected to the high-frequency high-voltage secondary current. While no casualties have resulted from the application of this current to the operator's body, it constitutes an undesirable hazard.

An object of our invention is to provide an arc-welding apparatus that is readily and economically manufactured.

Another object of our invention is to provide an arc-welding apparatus that requires a minimum of attention from the operator.

A more specific object of our invention is to provide for establishing an arc-stabilizing circuit upon the drawing of a welding current which circuit shall function to maintain the arc so long as a welding current continues to flow.

Other objects of our invention will become evident from the following detailed description, taken in conjunction with the accompanying drawing in which the single figure is a schematic diagram of the circuits used in our welding apparatus and the arrangement of the parts therein.

Referring to the drawing, an electrode holder 10, of any well known type, is provided for holding the electrode 11. The work 12 to be welded constitutes a second electrode and will be hereinafter referred to as such. A welding arc 13 is shown as being drawn between the electrodes 11 and 12.

In order to supply current to the welding arc, a transformer, shown generally at 14, is provided. The magnetic circuit of the transformer 14 comprises three legs 15, 16 and 17. An air gap 18 is provided in leg 17 to give a characteristic to the transformer to be hereinafter described.

A primary winding 19 is mounted on leg 15 and is connected to any suitable source (not shown) of low-frequency alternating current, such as a 60-cycle current.

A secondary winding for supplying the welding current to the welding electrodes, comprising two sections 20 and 21, is disposed on legs 16 and 17 of the transformer, as shown.

In order to control the current flowing to the welding electrodes, a plurality of resistors 22 are provided. Switches 23 provide for connecting any or all of the resistors 22 into the welding circuit.

The welding circuit may be traced from the welding electrode 12, through conductor 24, sections 20 and 21 of the secondary winding of the transformer 14, conductor 25, resistors 22, switches 23, conductor 26, electrode holder 10, electrode 11 and arc 13, to electrode 12.

In order to obtain the high-voltage high-frequency current for stabilizing the welding arc, a circuit adapted to oscillate at high frequencies is provided. This circuit comprises inductance coil 27, condenser 28 and spark gap 29.

Energy for the high-frequency oscillating circuit is obtained from a tertiary winding on the transformer 14. This tertiary winding, comprising sections 30 and 31, is located on legs 15 and 17 of the transformer.

In order to transfer high-frequency current from the oscillatory circuit to the welding electrodes and to prevent the low-frequency current from entering the oscillatory circuit, condensers 32 and 33 are provided.

The circuit from the oscillatory circuit to the welding electrodes may be traced from electrode 12, through conductor 34, condenser 32, conductor 35, inductance coil 27, conductor 36, condenser 33, conductors 37 and 26, and electrode holder 10, to electrode 11.

In the operation of the welding set, the primary winding 19 of the transformer 14 is energized by a low-frequency alternating current. A voltage is thereby induced in sections 20 and 30 of the secondary and tertiary windings, respectively. The voltage induced in section 30 of the tertiary winding is slightly lower than the voltage required to break down the spark gap 29. Because of the air gap 18 in leg 17 of the transformer sections 21 and 31, the secondary and tertiary windings, respectively, have substantially no voltage induced therein.

The desired number of switches 23 are closed to provide the required welding current.

The operator causes electrode 11 to contact with electrode 12 and immediately withdraws it slightly, thereby forming arc 13.

Since section 21 of the secondary winding is connected in series-circuit relation to section 20 of the same winding, the welding current flows through the former winding. Sufficient magnetomotive force is developed to induce flux in leg 17 of the transformer and to cause it to cross the air gap 18. The flux set up in leg 17 induces a voltage in section 31 of the tertiary winding.

Since sections 30 and 31 are connected in series-circuit relation, their voltages will be cumulative, and sufficient potential will be impressed across the spark gap 29 to break it down. The discharge of the spark gap 29 causes high-frequency oscillations in the circuit which extends from the spark gap 29, through the inductance coil 27 and condenser 28, to the spark gap.

As a result of establishing the high-frequency oscillations in the above circuit, a high voltage is impressed across inductance coil 27. This high frequency high voltage is transferred to the welding electrodes by means of conductors and condensers 32 and 33, in a manner well-known to those skilled in the art.

When the operator removes the electrode 11 sufficiently far from electrode 12, the arc is disrupted, and current ceases to flow in the secondary winding. Substantially no voltage is induced into section 31 of the tertiary winding, and the spark gap 29 no longer breaks down. The high-frequency oscillations cease, and the operator is not subjected to the high-voltage current produced by them.

Although we have shown and described a certain specific embodiment of our invention, we are fully aware that many modifications thereof are possible. Our invention, therefore, is not restricted except insofar as is necessitated by the prior art and by the spirit of the appended claims.

We claim as our invention:

1. An arc welding apparatus comprising, in combination, welding electrodes adapted to strike an arc, a transformer for supplying low-frequency current to the electrodes for maintaining the arc, an auxiliary source of high-frequency current connected permanently across the arc and means inductively related to said transformer and adapted to be energized only on flow of low-frequency current to the arc for energizing said high-frequency source.

2. An arc welding apparatus comprising, in combination, a pair of electrodes adapted to strike an arc, a transformer for supplying low-frequency current to the electrodes for maintaining the arc, an auxiliary source of high-frequency current connected permanently across the arc, means inductively related to said transformer and adapted to be energized only on flow of low-frequency current to the arc for energizing said high-frequency source, and means for preventing the flow of low-frequency current into the source of high-frequency current.

3. The combination with the secondary winding of a transformer adapted to supply current to a pair of welding electrodes, and resistors in series with the secondary winding adapted to vary the current to the welding electrodes, of a high-frequency circuit connected across the electrodes to stabilize the arc, said high-frequency circuit being capable of being energized only on flow of current to the welding electrodes.

4. The combination with the secondary and tertiary windings of a transformer adapted to supply current for arc welding, and a pair of welding electrodes of a circuit capable of producing oscillations of high frequency connected across the electrodes, said circuit being energized by the tertiary winding and capable of producing high-frequency oscillations only on the flow of current in the secondary winding.

5. An arc welding apparatus comprising, in combination, a set of welding electrodes adapted to form an arc, a transformer having an air-gap in one of its magnetic circuits, a primary winding on the transformer, a secondary winding on the transformer for supplying current to the welding electrodes, and means associated with the secondary winding and inductively responsive to the current change therein for producing high-frequency currents through the electrodes and across the arc.

6. An arc welding apparatus comprising, in combination, a set of welding electrodes adapted to strike an arc, a transformer having a plurality of magnetic circuits having an air-gap in one of them, a primary winding on the transformer, a secondary winding on the transformer, said secondary winding being divided into a plurality of sections adapted to be connected in series relation, one of said sections of the secondary winding being disposed on that part of the magnetic circuit containing the air-gap, a tertiary winding on the transformer, said tertiary winding being divided into a plurality of sections adapted to be connected in series-circuit relation, one of said sections of the tertiary winding being located around that part of the magnetic circuit containing the air-gap, and a circuit capable of producing high-frequency oscillations connected across the arc, said circuit being energized from said tertiary winding only when current flows in said secondary winding.

7. An arc welding apparatus comprising, in combination, a set of welding electrodes adapted to strike an arc, a transformer having a plurality of magnetic circuits having an air-gap in one of them, a primary winding on the transformer, a secondary winding on the transformer, said secondary winding being divided into a plurality of sections adapted to be connected in series relation, one of said sections of the secondary winding being placed around that part of the magnetic circuit containing the air-gap, a tertiary winding on the transformer, said tertiary winding being divided into a plurality of sections adapted to be connected in series relation, one of said sections of the tertiary winding being placed around that part of the magnetic circuit containing the air-gap, a circuit capable of producing high-frequency oscillations connected across the arc, said circuit being energized from said tertiary winding only when current flows in said secondary winding, and a condenser connected across the tertiary winding to provide a path for the high-frequency oscillations.

8. An arc welding apparatus comprising, in combination, a transformer for supplying low-frequency current to the welding arc, means for varying the flow of current from the transformer to the welding arc, an auxiliary source of high-frequency current connected permanently across the arc, means inductively related to said transformer and adapted to be energized only on flow of low-frequency current to the welding arc, for energizing said high-frequency source, and means for preventing the flow of low-frequency current into the source of high-frequency current.

9. An arc welding apparatus comprising, in combination, a main transformer adapted to supply low-frequency current to a pair of welding electrodes, a tertiary winding on said transformer, a spark gap and an inductance coil connected in series relation across said tertiary winding, a condenser connected across said tertiary winding, said inductance coil also being connected across the welding electrodes through a plurality of condensers.

10. In arc welding apparatus, in combination, welding electrodes adapted to strike an arc, a circuit connected to said electrodes for supplying welding current for performing a welding operation, a high-frequency generator connected to said welding circuit for supplying high-frequency current thereto to stabilize the operation of the welding arc, and means for energizing said generator only on flow of welding current in the welding circuit.

11. The combination with the secondary winding of a transformer adapted to supply current to a welding circuit, of a high-frequency generator connected to the welding circuit for superimposing high-frequency oscillations on the welding circuit, said high-frequency generator being inductively related to the transformer and capable of being energized only on flow of current in the secondary winding.

12. Arc welding apparatus comprising, in combination, a transformer provided with a primary winding for connection to a power source, a secondary winding for connection to a welding circuit and a tertiary winding, and a high-frequency generator connected to said welding circuit and disposed to be energized from said tertiary winding for superimposing high-frequency oscillations on the welding circuit.

13. Arc welding apparatus comprising, in combination, a transformer provided with a multicircuit magnetic core, one of said circuits being provided with an air gap, a primary winding on said transformer for connection to a power source, a secondary winding on said transformer for connection to a welding circuit, said secondary winding having a portion thereof surrounding the magnetic circuit provided with the air gap, a spark-gap high-frequency generator connected to the welding circuit for superimposing high-frequency oscillations thereon, and a tertiary winding on said transformer for connection to said generator, said tertiary winding provided with a portion in close mutual inductive relation to said primary winding and with another portion surrounding said magnetic circuit provided with the air gap.

14. The combination with a welding transformer for supplying current to an arc welding circuit and a spark-gap high-frequency generator connected to said welding circuit for superimposing high-frequency current thereon, of a tertiary winding on said transformer connected to said spark-gap generator, said tertiary winding being provided with a portion disposed to have a voltage induced therein at all times when the transformer is energized which is less than the voltage necessary to initiate the operation of said generator and another portion disposed to have a voltage induced therein on flow of current in the welding circuit in additive relation to the voltage induced in said first-named portion and of such value as to initiate the operation of said generator when so combined.

ERVYL M. GLENN.
ALBERT M. WIGGINS.